C. G. Nye.
Shearing Mach.

Nº 88,580.   Patented Apr. 6, 1869.

Witnesses
Wm J Dodge
F. A. Morley

Inventor
Charles G Nye

CHARLES G. NYE, OF ONONDAGA, NEW YORK.

Letters Patent No. 88,580, dated April 6, 1869.

IMPROVEMENT IN TEASEL-TRIMMER.

The Schedule referred to in these Letters Patent and making part of the same.

*To all whom it may concern:*

Be it known that I, CHARLES G. NYE, of Onondaga, in the county of Onondaga, and State of New York, have invented a new and improved Teasel-Trimmer; and I do hereby declare that the following is a full, clear, and exact description thereof, which will enable those skilled in the art to make and use the same, reference being had to the accompanying drawings, forming part of this specification, in which—

Similar letters of reference indicate like parts.

Figure 1:
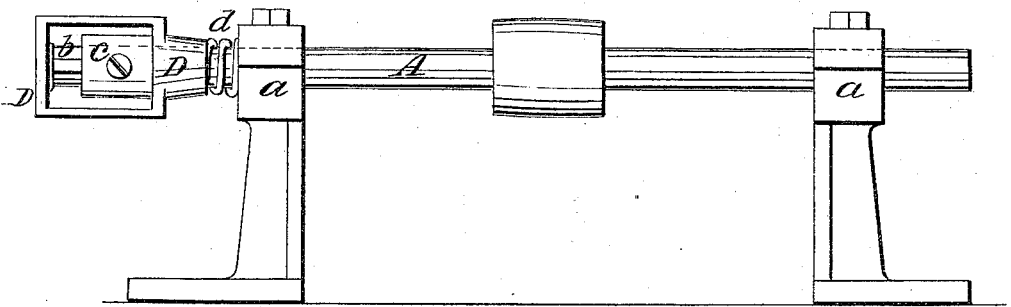
Figure 1 is a side view of my invention.
Figure 2:
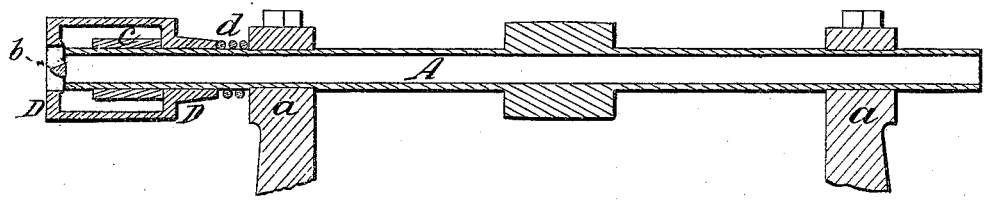
Figure 2 is a central longitudinal section.

In preparing the teasel-burr for gigging, or raising the nap, in the manufacture of cloth, the dried leaves which form a knot at the base of the burr, have heretofore been removed by hand.

This invention consists in a cutting-apparatus, which removes said knot of leaves with much greater expedition than by the ordinary method, thereby making an important saving in labor, as hereinafter more fully explained.

In the accompanying drawings—

A is a hollow shaft, which is supported in standards or boxes *a a*.

A cutter-head is formed on one or both ends of this shaft, so that one or two workmen can work at the same machine, as desired.

The cutters *b* are small straight knives, which occupy grooves in the external surface of shaft A, and are secured in place by a collar and set-screw *c*.

D is a guard, or burr-holder, which fits loosely on the end of the shaft A, and has a spiral spring, *d*, in its rear.

It is operated as follows:

The operator takes a teasel-burr, and pushes its stem into the hollow of the shaft A, until the base of the burr rests against the guard D.

A moderate pressure upon the burr then forces the guard D in upon the cutter-shaft, so that the base of the burr is carried to the revolving cutters *b*, and the before-mentioned knot, or leaves at the base of the burr are cut off immediately, without injury to the burr, and in this manner the said knots are removed as fast as the burrs can be handled.

The spring *d* allows the guard, or burr-holder D to yield under pressure, and holds it out from the knives while the burr is being removed, or another inserted.

The machine can be driven by a foot-treadle, or by other power.

By this means, the operation of preparing the burrs is greatly facilitated, and an important saving of labor made.

Having thus described my invention,

What I claim as new, and desire to secure by Letters Patent, is—

The hollow shaft A, and cutter-head *b c* D *d*, substantially as and for the purpose set forth.

The above specification of my invention signed by me, this 1st day of March, 1869.

CHARLES G. NYE.

Witnesses:
WM. J. DODGE,
F. A. MORLEY.